United States Patent Office 3,439,054
Patented Apr. 15, 1969

3,439,054
METAL CARBONYL CATALYST AND HYDROGENATION PROCESS THEREFOR
Wolfram R. Kroll, Linden, N.J., assignor to Esso Research and Engineering Company, a corporation of Delaware
No Drawing. Continuation-in-part of application Ser. No. 296,859, July 22, 1963. This application Dec. 8, 1966, Ser. No. 600,032
Int. Cl. C07f 5/06; C07c 15/00; B01j 11/22
U.S. Cl. 260—666
16 Claims

ABSTRACT OF THE DISCLOSURE

A catalyst formed by the reaction of a transition metal carbonyl and an organo aluminum compound is useful in the hydrogenation of unsaturated organic compounds.

---

This application is a continuation-in-part of copending application, Ser. No. 296,859, filed July 22, 1963, now patent no. 3,304,269.

This invention relates to novel catalyst complexes and the use of such catalyst complexes in hydrogenation reactions. More particularly, this invention relates to novel catalysts prepared by the reaction of a transition metal carbonyl and an organometallic, e.g., aluminum alkyl, compound. In a preferred embodiment, these novel catalysts are utilized to activate molecular hydrogen, particularly in the hydrogenation of unsaturated organic compounds. In another embodiment, these novel catalyst complexes may be utilized to promote isomerization reactions.

It is known that transition metal carbonyls do not catalyze the hydrogenation of unsaturated compounds, e.g., olefins, at room temperature and at low concentrations, i.e., less than about 1% of metal carbonyl. However, it has now been discovered that the addition of a small amount of an organometallic compound to the reaction mixture of a metal carbonyl and an unsaturated organic compound will permit the hydrogenation (reduction) of the unsaturated organic compound at low catalyst concentrations, and, more importantly, at moderate or low temperatures and/or pressures.

Thus, in accordance with this invention, novel catalyst complexes are formed by the reaction of a transition metal carbonyl with an organo aluminum compound. The reaction product may then be utilized to catalyze various hydrogenation reactions. This particular result is rather unexpected since iron carbonyl, for example, is known to poison hydrogenation catalysts at room temperature. While not wishing to be bound by any particular theory, it is believed that the organo aluminum compound serves to complex with the carbonyl compound in a manner such as to activate that compound as a hydrogenation catalyst. Organo aluminum compounds have been previously utilized in the preparation of catalysts such as the Ziegler type catalyst systems. However, such preparations are based on the organo aluminum compound being a reducing agent, i.e., reducing a transition metal to the zero valence state, e.g., U.S. 3,113,986. However, the reaction system of the present invention utilizes a transition metal carbonyl wherein the transition metal is already in the reduced or zero valence state. Therefore, the normal reducing function of the organo aluminum compound is not utilized, its main function being to complex with the carbonyl to yield a novel hydrogenation catalyst complex.

The transition metal of the carbonyl may, generally, be any transition metal selected from Groups I-B—VIII-B of the Periodic Chart of the Elements. Illustrative of the metals that may be employed are: titanium, vanadium, chromium, manganese and the like. The transition metals of Group VIII, i.e., iron, cobalt, nickel, platinum, rhenium, palladium, ruthenium, osmium, an diridium are preferred, however, iron, cobalt and nickel are more preferred, while iron and cobalt are the most desirable. As mentioned, the transition metal is employed as the carbonyl. Mono-nuclear carbonyls, as well as bi-nuclear carbonyls, e.g., $Fe_2(CO)_9$ and tri-nuclear carbonyls, e.g., $Fe_3(CO)_{12}$, may be employed. Hydrocarbonyls, e.g., cobalt hydrocarbonyl $CoH(CO)_4$, may also be employed, but the carbonyls are preferred because of their ready availability, ease of handling and freedom from excessive toxicity and volatility. Carbonyls can be easily prepared by reducing a metal salt in the presence of carbon monoxide. Iron carbonyl, for example, can be prepared by reducing ferrous oxalate in the presence of carbon monoxide. Nonhalogen containing substituted transition metal carbonyls may also be employed because of their stability and solubility in common solvents.

The organo aluminum compounds utilized in this invention may be represented by the formula: $AlR_3$ wherein R is a hydrocarbyl radical, preferably a $C_1$-$C_{20}$ hydrocarbyl, more preferably a $C_1$-$C_{20}$ alkyl, cycloalkyl, aryl or cyclopentadienyl radical, still more preferably a $C_1$-$C_{20}$ alkyl, and yet more preferably a $C_2$-$C_8$ alkyl radical, or a hydrogen, and at least one R is a hydrocarbyl radical. Typical examples of the compounds that may be employed are: triethyl aluminum, tributyl- and triisobutyl aluminum, triphenyl aluminum, diethyl aluminum—cyclopentadienyl, diethyl aluminum allyl, diethyl isobutyl aluminum, ethyl dibenzyl aluminum, triheptyl aluminum, trioctyl aluminum, tricyclohexyl aluminum, diethyl aluminum hydride, diisobutyl aluminum hydride, and the like. Organo aluminum complexes may also be employed where close control of the reaction is desired.

Organo aluminum compounds such as halides, e.g. ethyl aluminum sesquichloride, and alkoxides, e.g., n-butoxy aluminum diethyl, both of which are quite useful in Ziegler type catalysts, do not produce an active catalyst when reacted with the metal carbonyls of this invention.

The reaction of the transition metal carbonyl and the organo aluminum compound normally takes place in the presence of a suitable inert solvent. Such solvents may be paraffinic, i.e., $C_5$-$C_{20}$ paraffins such as pentane, heptane, octane, nonane, hexadecane, etc.; $C_6$-$C_{12}$ aromatic, e.g., benzene and the like. Temperatures of about −50 to 200° C., preferably 0° to 130° C. are employed. The reaction proceeds slowly at the lower ends of the ranges, however, and is normally complete in about a few minutes to several days, e.g., 30 minutes to 3 days. Pressures are not critical and may vary widely. Normally atmospheric pressure is utilized. Preparation of the catalyst is generally conducted in an inert atmosphere, e.g. nitrogen, argon, methane, etc., as well as in the presence of hydrogen.

The molar ratio of organo aluminum compound to transition metal carbonyl should range from about 100/1 to about 1/1, preferably 15/1 to 1/1.

It is sometimes desirable to conduct the reaction without isolation of the catalyst. The catalyst formulation can then be obtained by aging and/or heating the solution at a temperature below the boiling point or decomposition point of the carbonyl. Such compositions are especially useful in selective hydrogenations.

In carrying out reactions involving the novel catalyst complexes of this invention, the catalyst may be preformed and added to the reaction mixture as such, or it may be formed in situ. Thus, for example, to a mixture of an iron carbonyl and an unsaturated compound, an aluminum trialkyl may be added; or, the carbonyl and aluminum trialkyl may be reacted prior to the addition of the unsaturated component. However, it has been found that it is preferable to form the catalyst reaction product prior to its introduction into the reaction mixture. It is even more preferable to allow the reaction product to age for about 24 hours prior to use in order to increase catalytic activity. The catalyst complex may also be recovered and used as a solid in fixed bed, fluid bed, or slurry type operations. Recovery of a solid catalyst is possible since the reaction product normally forms a fine precipitate which is dispersed throughout the reaction mixture. The solid can be recovered by a variety of well-known means, e.g., distilling away volatile components, centrifugation, filtration, settling and decantation. From the standpoint of catalyst activity, it is preferred to use the catalyst in its aged or solid form rather than using a catalyst formed in situ. Solid catalysts may also have their activity enhanced by aging or moderate heat treatment. The heat treatment may be easily accomplished by successive reuse of the catalyst.

The catalysts prepared in the manner described herein may be employed in a variety of hydrogenation reactions. Generally, these catalyst complexes may be employed in the hydrogenation of unsaturated organic compounds. More specifically, these catalyst complexes are employed to reduce unsaturated compounds capable of being reduced and preferably reduce unsaturation in organic compounds having carbon-carbon, carbon-nitrogen, and carbon-oxygen (as in carbonyl) unsaturation. The catalysts may also be employed in the complexing and fixation of nitrogen as well as in the hydrogenation of nitrogen to form ammonia.

Feeds containing carbon-carbon unsaturation may be acetylenic, olefinic, aromatic, or mixtures thereof, in nature. These feeds may be acyclic, cyclic, substituted or unsubstituted and may contain dienes and trienes. Typical examples of such compounds are: butenes, pentenes, hexenes, cyclopentene, cyclohexene, cyclopentadiene, cyclooctadiene, cyclododecatriene, vinyl cyclohexene, acetylene, hexyne-3, octyne-3, phenyl acetylene, benzene, toluene, xylene, naphthalenes, and the like. It will be obvious to those skilled in the art that some of the above-disclosed unsaturated compounds will be more difficult to reduce than others. Therefore, preferred unsaturated carbon-carbon compounds are those compounds, preferably of 2–30 carbon atoms, which contain ethylenic unsaturation, i.e., nonaromatic, or acetylenic unsaturation. Particularly preferred are aliphatic unsaturated compounds, which contain olefinic or acetylenic unsaturation.

Among the carbonyl compounds that can be reduced are aldehydes, ketones, esters, etc.; typical examples of which are acetone, methylethylketone, cyclohexanone, benzophenone, acetophenone, steroidal ketones, phorone, isophorone, benzaldehyde, acetaldehyde, propionaldehyde, propyl acetate, benzyl acetate, ethyl stearate, ethyl valerate, etc.

Compounds containg carbon-nitrogen unsaturation may also be reduced in the presence of these novel catalysts. Such compounds are illustrated by benzonitrile, benzylimine, quinoline, terephthalonitrile, isophthalonitrile, acetonitrile, propionitrile, tolunitrile, and the like.

Depending upon the particular feedstock to be hydrogenated, reaction conditions may normally vary over wide ranges. Generally, however, temperatures will range from about −20° to about 250° C., preferably 20° to 150° C., while hydrogen pressures of about 1 atm. to about 10,000 p.s.i.g., preferably 50 to 1000 p.s.i.g. will be employed. Olefinically unsaturated compounds are preferably hydrogenated at temperatures of about −20° to 120° C., preferably 20° to 120° C., and pressures of about 1 atm. to 5000 p.s.i.g., preferably 50 to 1000 p.s.i.g. When more difficulty reducible feedstocks are employed, i.e., nitriles or aromatics, the reaction rate can be enhanced by utilizing higher temperatures and/or pressures, e.g., up to about 200° C., and 5000 p.s.i.g.

Reaction time is not critical and may range from a few minutes to several hours or longer, e.g., from 1 minute to 10 hours or more. Similarly, catalyst concentrations are not critical. Normally, the novel catalysts will be utilized in catalytic amounts, i.e., at least about 0.0001, preferably 0.0001 to about 5.0 wt. percent based on the transition metal, and more preferably 0.1 to 2.0 wt. percent. The use of inert solvents is preferred and these may be similar to those previously mentioned for preparing the catalyst.

In a particularly preferred embodiment of this invention, the novel catalysts disclosed herein may be employed in the selective hydrogenation (or reduction) of certain types of unsaturation in preference to other types of unsaturation. These selective reactions include:

(1) Hydrogenation of acetylenic compounds in preference to ethylenic compounds such as in the removal of acetylene impurities from olefin-containing streams;

(2) Hydrogenation of dienes, e.g., butadiene, in olefinic feed streams, such as the selective hydrogenation of butadiene in ethylene streams;

(3) Hydrogenation of terminal olefinic bonds in preference to internal olefinic bonds, such as in the preparation of mono-olefin monomers (will also occur when both types of bond are present in the same compound), e.g., preferential hydrogenation of hexene-1 in the presence of cyclohexene, hydrogenation of the terminal bond only in 1,4-octadiene;

(4) Hydrogenation of aliphatic unsaturation in preference to cyclic unsaturation, such as in monomer preparation, e.g., vinyl cyclohexene to ethyl cyclohexene;

(5) Hydrogenation of aliphatic or alicyclic unsaturation in preference to aromatic unsaturation, even when both types of unsaturation are present in the same molecule, e.g., styrene to ethyl benzene; and (6) Hydrogenation of olefinic unsaturation in organic compounds having other functional groups, e.g., unsaturated esters, acid anhydrides, amines, nitriles, such as maleic acid, crotonaldehyde, etc.

As noted previously, carbonyls are poisons for some hydrogenation catalysts. However, the catalyst complex of the present invention is not affected by the presence of unreacted carbonyls. This fact may be used advantageously in the hydrogenation of poly-unsaturated compounds, e.g., cyclododecatriene, wherein the double bonds may be complexed with carbonyls and protected from hydrogenation.

These selected hydrogenation reactions may be conducted under the conditions described above, by simply monitoring the reaction effluent. When the desired hydrogenation is complete, the reaction may be stopped since further hydrogenation can lead to the reduction, generally, of all unsaturation present.

In another embodiment of this invention, the novel catalysts described herein may also be utilized in isomerization reactions. Thus, terminal aliphatic olefins can be isomerized to internal olefins under relatively mild conditions. Also, cyclic di- and polyolefins can be isomerized to conjugated diolefins, e.g., cyclooctadiene-1,5 can be isomerized to cyclooctadiene-1,3 in the presence of these novel catalyst complexes. Such a result is not possible in the presence of the carbonyl alone. Isomerization reactions can be conducted at the same conditions of temperature, pressure and catalyst concentration as used in hydrogenation reactions.

The products obtained from hydrogenation reactions can be utilized for a wide variety of purposes, e.g., hydrogenation of petroleum feeds to up-grade gasoline fractions, hydrogenation of ketones/aldehydes to alcohols for use in the cosmetic industry, etc.

Having described the present invention, the following examples will serve to illustrate and give a better appreciation of this invention. However, no limitations are to be implied from these examples other than those contained in the appended claims.

EXAMPLE 1

130 mg. $Fe(CO)_5$ and 2 ml. triisobutyl aluminum in 10 ml. pentane were added to a solution of 50 ml. 4-vinyl cyclohexene in 40 ml. pentane. At 1000 p.s.i. hydrogen and 50° C. all the vinyl groups were hydrogenated in 69 minutes. Analysis of the reaction product showed 92.5% ethyl cyclohexene and 7.5% ethyl cyclohexane.

EXAMPLE 2

2 ml. triisobutyl aluminum were added to 130 mg. iron pentacarbonyl in 10 ml. pentane. This yellow catalyst solution was added to 50 ml. hexene-1 and 40 ml. pentane. Subsequently a hydrogenation was carried out at 1000 pounds and 30° C. in a stirred autoclave. After 15 minutes the reaction was stopped and the reaction products were analyzed. The hexene-1 had been converted to 86.1% to normal hexane and 13.9% hexene isomers.

EXAMPLE 3

127 mg. iron pentacarbonyl were mixed with 2 ml. aluminum triisobutyl and 10 ml. pentane at room temperature. The iron carbonyl used was a commercial product. Subsequently, a mixture of 50 ml. cyclohexene and 40 ml. pentane was added. The reaction mixture was then transferred into an autoclave and hydrogenated at 1000 pounds hydrogen pressure and 50° C. After 47 minutes no cyclohexane had been formed as evidenced by GC analysis of the reaction product. This indicates that the catalyst of the invention is highly selective in differentiating between terminal and internal double bonds. Continuing the reaction or operating under more severe conditions would result in the hydrogenation of the cyclohexene.

EXAMPLE 4

This example shows a selective hydrogenation of terminal unsaturation in the presence of internal unsaturation. To the solution described in the previous example a mixture of 20 ml. hexene-1 and 10 ml. pentane was added. Subsequently, 139 mg. iron pentacarbonyl, 4 ml. triisobutyl aluminum and 10 ml. pentane were added to the reaction mixture. Subsequently, the mixture was hydrogenated at 1000 pounds hydrogen pressure and 28° C. After 35 minutes the reaction product was analyzed. No more hexene-1 was present. It had been converted to 93.5% normal hexane and 6.5% hexene isomers. At the same time only 2.4% cyclohexene had been hydrogenated to cyclohexane. This shows the high selectivity of the hydrogenation catalyst.

EXAMPLE 5

This example shows that iron pentacarbonyl alone is not an active hydrogenation catalyst 131 mg. iron pentacarbonyl and a mixture of 20 grams cyclohexene and 20.5 grams hexene-1 were diluted with 40 ml. pentane. This reaction mixture was treated with 1000 pounds hydrogen pressure and 25° C. After 48 minutes the reaction products were analyzed. No hydrogenation of the hexene-1 or the cyclohexene had occurred, indicating that the catalyst was inactive.

EXAMPLE 6

This example shows that reaction of iron pentacarbonyl with ethyl aluminum sesquichloride does not result in the formation of an active hydrogenation catalyst. To the reaction mixture of Example 5 were added 4 ml. ethyl aluminum sesquichloride. Subsequently the reaction mixture was treated with hydrogen at 1000 pounds and reaction temperatures from 25° C. up to 55° C. After a period of 140 minutes the reaction products were analyzed. No hydrogenated product could be detected. No isomers of hexene-1 could be detected either. In a separate experiment, n-butoxyaluminum diethyl could not activate iron pentacarbonyl to give an active hydrogenation catalyst. It was tested for the hydrogenation of cyclohexene as well as for the hydrogenation of hexene-1 under similar reaction conditions as described in the above experiment, and no hydrogenated products were detected on analysis.

EXAMPLE 7

This example shows that instead of trialgyl aluminums, also dialkyl aluminum hydrides can be used to activate iron pentacarbonyl. A catalyst mixture was prepared by mixing 108 mg. iron pentacarbonyl, 2 ml. diisobutyl aluminum hydride and 10 ml. pentane. This catalyst mixture was charged into a 300 ml. magnetically stirred autoclave. Subsequently, at room temperature and under nitrogen blanket were added a mixture of 50 ml. hexene-1 and 40 ml. normal pentane. A short time afterwards the hydrogenation was started at about 25° C. and 1000 pounds. After 146 minutes the reaction product was analyzed and no more hexene-1 could be found. 96.8% normal hexane had been formed and 3.2% hexene isomers.

EXAMPLE 8

In all examples so far, catalysts were prepared in situ and used without isolating them. This experiment shows a catalyst preparation where iron pentacarbonyl is activated with triethyl aluminum and subsequently, the solid catalyst is isolated and used in the hydrogen of cyclohexene.

Catalyst preparation

To a solution of 11.4 grams of triethyl aluminum in 33 grams normal heptane was added 15.2 grams iron pentacarbonyl in heptane. The reactants were heated at atmospheric pressure from 70 to 90° C. until no more gas was evolved. Subsequently, the volatile components were removed by distillation and a solid residue was obtained which had 8.9% iron.

Hydrogenation of cyclohexene 249 mg. of this solid were charged into an autoclave liner followed by addition of 95 mm. cyclohexene in heptane. Subsequently a hydrogenation was carried out at 100 pounds hydrogen pressure and 22° C. After 128 minutes 50% of the cyclohexene had been hydrogenated.

EXAMPLE 9

This example shows the hydrogenation of hexene-1 with a solid catalyst that has been obtained from the reaction of iron pentacarbonyl with aluminum triethyl as described in Example 8. It is apparent by comparing the hydrogenation data of the first examples with Examples 8 and 9 that the catalyst preparation described in Example 8 gives a more active iron catalyst due to the aging involved. In this experiment 217 mg. of the catalyst were used to hydrogenate 6.6 grams hexene-1 in heptane solvent. The hydrogenation was carried out at 100 pounds constant pressure and 22° C. constant temperature in a stirred autoclave. The time for the conversion of 50% hexene to normal hexane was found to be 22–25 minutes. After the hydrogenation the catalyst settled out very readily giving a product containing a clear odorless liquid and a black precipitate. This enables a ready removal of the catalyst from the reaction product, e.g., by decantation or filtration.

EXAMPLE 10

This example shows the hydrogenation of a polyolefin using the solid complex iron catalyst described in Example 8. To a mixture of 48.3 grams heptane and 17.9 grams cyclododecatriene cis/trans/trans 443 mg. of iron catalyst were added. Subsequently the mixture was hydrogenated at 1000 p.s.i. and 22° C. constant temperature. After 400 minutes the hydrogenation was stopped and the product analyzed. It consisted of 97.8% cyclododecane and 2.2% cyclododecene.

EXAMPLE 11

This example shows the results of the effect of aging on the activity of the hydrogenation catalyst. A catalyst solution was prepared by mixing 1 gram iron pentacarbonyl and 5 grams triethyl aluminum at room temperature. For each hydrogenation test 1 ml. of this solution was used in the hydrogenation of hexene-1 (20 ml.) in admixture with pentene (10 ml.) at 500 pounds initial hydrogen pressure and room temperature for a period of 8 minutes each. With 1 hour catalyst aging, 82% conversion to n-hexane was obtained, whereas after 22 hours aging the conversion went up to 92%.

EXAMPLE 12

This example shows the isomerization activity of the complex catalyst system. A mixture of 1 ml. iron carbonyl and 5 ml. triethyl aluminum is added to 20 ml. cyclooctadiene-1.5 and stirred for over 24 hours at room temperature with exclusion of light. A sample taken after this period shows 24.1% conversion to cyclooctadiene-1.4 and cyclooctadiene-1,3. If the iron carbonyl is used without the aluminum alkyl under the same reaction conditions, practically no isomerization occurs.

EXAMPLE 13

This example shows the preparation of a solid catalyst composition in which diisobutyl aluminum hydride and iron carbonyl have been used as components. A solution of 11 grams diisobutyl aluminum hydride in 6.9 grams heptane was reacted with 4 grams iron carbonyl over a period of 24 hours at room temperature. A reaction was indicated by the evolution of gas. Subsequently, the product was heated in vacuo slowly to 60° C. at 20 mm. to remove solvent and unreacted components. This procedure was continued at elevated temperature and higher vacuo until no more distillate was obtained. The resulting, dark-colored solid was analyzed. It proved to be practically insoluble in aliphatic hydrocarbons. It contained 9.0% Fe and 17.9% Al, thus having a molar ratio of aluminum to iron as 4.1:1. The catalyst contained 13.45% oxygen, thus giving an oxygen to iron molar ratio of 5.2:1. Hydrolysis of the catalyst gave isobutane from the aluminum-isobutyl groups left. Magnetic measurements indicated the absence of metallic iron as well as the absence of any iron carbonyl.

The reactions described and illustrated in this invention can be conveniently carried out under homogeneous, heterogeneous, or liquid slurry systems. Additionally, the solid catalyst can be employed in gas phase reactions such as: hydrogenation, isomerization, olefin disproportionation, dimerization and ammonia decomposition and synthesis.

What is claimed is:

1. A hydrogenation catalyst composition comprising the reaction product of a transition metal carbonyl, said transition metal being selected from the group consisting of iron and cobalt, with an organo aluminum compound having the formula $AlR_3$ wherein R is selected from the group consisting of hydrogen and $C_1$–$C_{20}$ hydrocarbyl radicals and at least one R is a hydrocarbyl radical.

2. The composition of claim 1 wherein the organo aluminum compound is an aluminum trialkyl.

3. The composition of claim 1 wherein the transition metal is iron.

4. A process for reducing unsaturated organic compounds capable of being reduced which comprises reacting the unsaturated compound with hydrogen in contact with a catalyst prepared by reacting a transition metal carbonyl, said transition metal being selected from the group consisting of iron and cobalt, with an organo aluminum compound having the formula $AlR_3$ wherein R is selected from the group consisting of hydrogen and $C_1$–$C_{20}$ hydrocarbyl radicals and at least one R is a hydrocarbyl radical at temperatures ranging from about −20° C. to 250° C., pressures ranging from about atmospheric to about 10,000 p.s.i.g. and in the presence of an inert solvent.

5. The process of claim 4 wherein the unsaturated organic compound has unsaturated sites selected from the group consisting of carbon-carbon, carbon-nitrogen, and carbonyl unsaturation.

6. The process of claim 4 wherein the unsaturated organic compound is a $C_2$–$C_{30}$ hydrocarbon having nonaromatic carbon-carbon unsaturation.

7. The process of claim 4 wherein the catalyst is present in an amount of at least about .0001 wt. percent based on transition metal.

8. The process of claim 4 wherein the temperature ranges from about 20° C. to 150° C. and the pressure ranges from about 50 p.s.i.g. to 1000 p.s.i.g.

9. A hydrogenation process which comprises reacting an unsaturated compound having unsaturated sites selected from the group consisting of carbon-carbon, carbon-nitrogen, and carbonyl unsaturation with hydrogen at a temperature of about 20° C. to 150° C. and a pressure of about 50 to 1000 p.s.i.g. in contact with a catalyst which comprises the reaction product of a Group VIII transition metal carbonyl, said transition metal being selected from the group consisting of iron, cobalt, and an aluminum trialkyl, each alkyl of which contains 1–20 carbon atoms, said catalyst being present in an amount of at least .0001 wt. percent based on transition metal, and in the presence of an inert solvent.

10. The process of claim 9 wherein the unsaturated compound is a $C_2$–$C_{30}$ hydrocarbon having nonaromatic carbon-carbon unsaturation.

11. The process of claim 10 wherein both terminal and nonterminal olefinic unsaturation are present and the terminal unsaturation is preferentially hydrogenated.

12. The process of claim 10 wherein the catalyst is aged for at least 24 hours prior to use.

13. The process of claim 10 wherein both aliphatic and cyclic unsaturation are present and the aliphatic unsaturation is preferentially hydrogenated.

14. An isomerization process which consists essentially of contacting a nonconjugated diolefin with a catalyst which consists of the reaction product of a Group VIII transition metal carbonyl, said transition metal being selected from the group consisting of iron and cobalt, with an aluminum trialkyl, each alkyl of which contains 1–20 carbon atoms, at temperatures of about −20° to 250° C. pressures of about 1 atm. to 10,000 p.s.i.g. in the presence of an inert solvent, and recovering a conjugated diolefin.

15. The process of claim 14 wherein the nonconjugated diolefin is cyclooctadiene-1,5 and the conjugated diolefin is cyclooctadiene-1,3.

16. A process for preparing a hydrogenation catalyst which comprises reacting a transition metal carbonyl, said transition metal being selected from the group consisting of iron and cobalt, with an organo aluminum compound having the formula $AlR_3$ wherein R is selected from the group consisting of hydrogen and $C_1$–$C_{20}$ hydrocarbyl radicals and at least one R is a hydrocarbyl, the molar ratio of the organo aluminum to the transition metal carbonyl being about 100/1 to 1/1, at temperatures of −50° C. to +200° C., conducting the reaction in the presence of an inert solvent and aging the catalyst for at least about 24 hours prior to use.

References Cited

UNITED STATES PATENTS

| | | | |
|---|---|---|---|
| 3,008,943 | 11/1961 | Guyer | 260—93.7 |
| 3,247,270 | 4/1966 | Kirk. | |
| 3,304,269 | 2/1967 | Kroll et al. | 260—2 |

FOREIGN PATENTS

| | | |
|---|---|---|
| 1,140,569 | 1/1963 | Germany. |
| 917,103 | 12/1962 | Great Britain. |

OTHER REFERENCES

J. E. Arnet et al.: J. Amer. Chem. Soc., volume 83, pp. 2954–5, 1961.

DELBERT E. GANTZ, *Primary Examiner.*

V. O'KEEFE, *Assistant Examiner.*

U.S. Cl. X.R.

252—431; 260—667, 680, 676